Sept. 4, 1951  J. L. EDELEN  2,567,062

FILTER BOWL CONSTRUCTION

Filed Oct. 23, 1947

*INVENTOR.*
JAMES L. EDELEN
BY
*George R. Erson*
ATTORNEY

Patented Sept. 4, 1951

2,567,062

UNITED STATES PATENT OFFICE 2,567,062

FILTER BOWL CONSTRUCTION

James L. Edelen, Kirkwood, Mo., assignor to Carter Carburetor Corporation, St. Louis, Mo., a corporation of Delaware Application October 23, 1947, Serial No. 781,592

1 Claim. (Cl. 285—22)

This invention relates to locking means for threadedly assembled members such, for instance, as a body and settling bowl of a fuel filter. Heretofore, fuel filters of the type illustrated, particularly, in Kommer Patent No. 2,146,397, have been supplied with a bail connecting the body and bowl for maintaining the assembly of these two parts. It has not been feasible to threadedly attach the body and bowl because of the danger of unthreading as a result of engine vibration.

Accordingly, it is an object of the present invention to provide means for locking the bowl and body when threadedly assembled so as to eliminate the use of the extra bail without the danger of unthreading mentioned.

This object and other more detailed objects hereafter appearing are attained by the device illustrated in the accompanying drawing in which.

Figure 1:
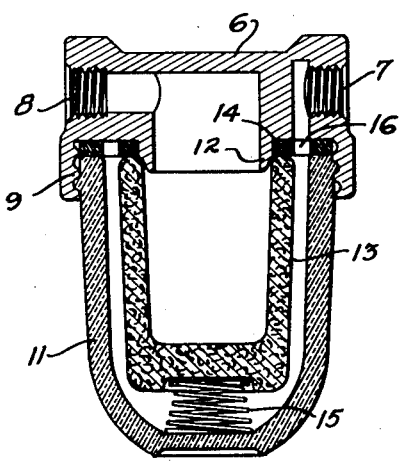
Fig. 1 is a vertical section through a fuel filter embodying the invention.

The filter comprises a die cast body member 6 having tapped inlet fitting 7 and outlet fitting 8 for attachment to the fuel line which stationarily mounts and supports the filter. An internally threaded sleeve 9 depends from the body for receiving the male threaded upper edge portion 10 of a glass bowl 11. A depending annular lip 12 on the body provides for centering a ceramic filter element 13 which, at its upper end bears against the inner portion of a sealing gasket 14 and, at its lower end, rests upon a coiled spring 15 compressed between the filter element and the bottom of bowl 11. The outer portion of gasket 14 provides a seal between the bowl and body and a series of holes 16 in the gasket provide for passage of fuel between the bowl and filter. In operation, fuel enters through inlet 7 and drops into bowl 11 from whence it filters through element 13 and thence flows out through tapped outlet 8.

Figure 2:
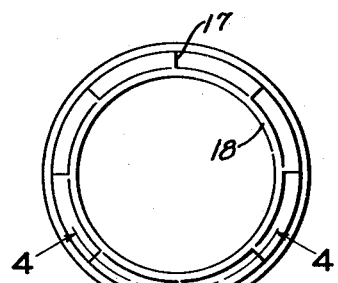
Fig. 2 is a top view of the bowl disassembled.
Figure 3:
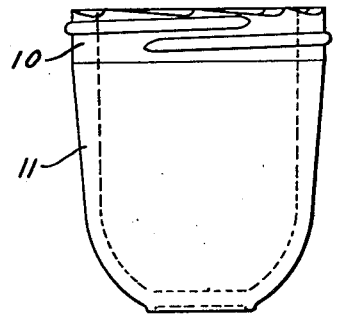
Fig. 3 is a side view of the bowl disassembled.
Figure 4:
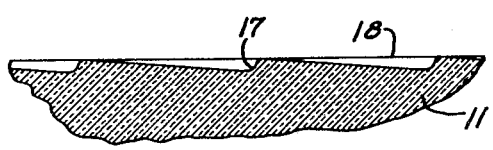
Fig. 4 is a section on the curved line 4—4 of Fig. 2.
Figure 5:
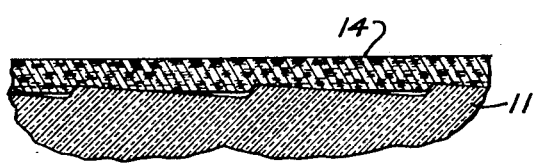
Fig. 5 is a section similar to Fig. 2 and showing a portion of the assembled gasket.

In order to prevent unauthorized unthreading of the bowl, locking means is provided which consists of a gasket 16 of suitable yielding material interposed between the body and the upper edge of bowl 11. As best shown in Fig. 2, the outer portion of this bowl upper edge is provided with serrations or ratchet teeth 17 for embedding into gasket 14 in the assembly to thereby resist rotation of the bowl relative to the body in the unthreading direction. Just inside of teeth 17 there is provided on the bowl a smooth surfaced, annular ring 18 for sealing engagement with the gasket, as made necessary by the locking teeth, as illustrated in Fig. 5.

The invention is broadly applicable to any two threadedly coupled members for resisting unthreading, particularly due to vibration. Teeth may be provided on both members, but in the present instance where the body is stationarily mounted, only the bowl need be locked in the manner described.

The invention may be modified in various respects as will occur to those skilled in the art and the exclusive use of all modifications as come within the scope of the appended claim is contemplated.

I claim:

The combination with a body arranged for stationary mounting and a bowl with a threaded wall portion for assembly with said body, of locking means comprising a gasket of yielding material between said body and bowl, ratchet teeth on the threaded edge of said bowl for embedding in said gasket to thereby resist unthreading of said bowl and a smooth surfaced, narrow ring on said threaded edge adjacent said teeth and extending substantially flush therewith for sealing engagement with said gasket.

JAMES L. EDELEN.

REFERENCES CITED

The following references are of record in the file of this patent:

UNITED STATES PATENTS

| Number | Name | Date |
|---|---|---|
| 382,191 | Redington | May 1, 1888 |
| 715,891 | Somerly | Dec. 16, 1902 |